United States Patent [19]

Dole

[11] Patent Number: 5,213,712
[45] Date of Patent: May 25, 1993

US005213712A

[54] LANTHANUM LUTETIUM OXIDE PHOSPHOR WITH CERIUM LUMINESCENCE

[75] Inventor: Stephen L. Dole, Burnt Hills, N.Y.

[73] Assignee: General Electric Company, Schenectady, N.Y.

[21] Appl. No.: 833,176

[22] Filed: Feb. 10, 1992

[51] Int. Cl.$^5$ ............................................. C09K 11/78
[52] U.S. Cl. ............................................. 252/301.4 R
[58] Field of Search ................................. 252/301.4 R

[56] References Cited

FOREIGN PATENT DOCUMENTS 1208565 10/1970 United Kingdom ......... 252/301.4 R

OTHER PUBLICATIONS

Porotnikov et al. "Chem. Abstracts", vol. 100, 1984, 42233s.

*Primary Examiner*—Jack Cooper
*Attorney, Agent, or Firm*—James E. McGinness; James Magee, Jr.

[57] ABSTRACT

A phosphor comprising, an $ABO_3$ oxide compound wherein A is about 0.002 to 22 atomic percent cerium and up to about 22 atomic percent lanthanum, and B is about 18 to 22 atomic percent of at least one of lutetium or yttrium.

2 Claims, No Drawings

LANTHANUM LUTETIUM OXIDE PHOSPHOR WITH CERIUM LUMINESCENCE

BACKGROUND OF THE INVENTION

This invention relates to a cerium activated rare earth oxide phosphor for computerized tomography and other X-ray, gamma radiation, and nuclear radiation detecting applications.

Computerized tomography scanners are diagnostic instruments used in industrial and medical imaging. A body is exposed to a relatively planar beam or beams of radiation, such as x-ray or gamma ray radiation, the intensity of which varies in direct relationship to the energy absorption along a plurality of body paths. By measuring the radiation intensity along these paths from a plurality of different angles or views, a radiation absorption coefficient can be computed for various areas in any plane of the body through which the radiation passes. The absorption coefficients are used to produce a display of, for example, bodily organs intersected by the radiation.

Phosphors can be used to form scintillators which are excited by the impinging X-ray or gamma radiation, and emit optical wave length radiation. The optical output from the scintillator material is made to impinge upon photo electrically responsive materials in order to produce electrical output signals. The amplitude of the signals is directly related to the intensity of the impinging X-ray or gamma radiation. The electrical signals are digitized for processing by digital computer means which generate the absorption coefficients in a form suitable for display on a cathode ray tube screen or other permanent media.

In general, it is desirable that the amount of light output from the phosphors and resulting scintillator be as large as possible for a given amount of X-ray or gamma ray energy. This is particularly true in the medical tomography area where it is desired that the energy intensity of the X-ray be as small as possible to minimize any danger to the patient.

Another important property that the phosphor material should possess is that of short afterglow, persistence, or decay time constant. As used herein, the term "decay time constant" means the time for luminescence output to decay to about 36.8 percent of the maximum light output after the excitation radiation ceases. This means that there should be a relatively short period of time between the termination of the high energy radiation excitation and the cessation of light output from the phosphor or scintillator. If this is not the case, there is a blurring, in time, of the information bearing signal generated, for example, when the scintillator is used to produce tomographic imaging data. Furthermore, if rapid tomographic scanning is desired, the presence of the afterglow tends to severely limit the scan rate, thereby rendering difficult the view of moving bodily organs, such as the heart or lungs.

Positron emission tomography scanners utilize gamma ray detector systems. The detector system is capable of capturing gamma rays and converting them into a luminescent output. The luminescent output is converted by means of a photo multiplier into an electrical signal. Bismuth germanate has the necessary high stopping power required for capturing gamma radiation, and has been used in gamma ray detection systems. The gamma ray stopping power of bismuth germanate has been measured to be about 0.955 per centimeter. The decay time constant for bismuth germanate is about 300 nanoseconds.

It is an object of this invention to provide a rare earth oxide compound phosphor containing cerium to provide luminescence in the phosphor.

It is another object of this invention to provide a phosphor having a high gamma ray stopping power, e.g., comparable to bismuth germanate.

It is another object of this invention to provide a phosphor having a high gamma ray stopping power, and a fast decay time constant, e.g., less than the 300 nanosecond decay time constant for bismuth germanate.

BRIEF DESCRIPTION OF THE INVENTION

The phosphor of this invention is a rare earth oxide compound comprised of about 0.002 to 22 atomic percent cerium, up to about 22 atomic percent lanthanum, about 18 to 22 atomic percent of at least one of lutetium or yttrium, and the balance substantially oxygen. As used herein, the term "balance substantially oxygen" means the remainder of the composition is oxygen, however, other elements may be present as impurities up to an amount that does not substantially impair the light emitting properties of the phosphor. For example, elements such as hafnium, zirconium, aluminum, silicon, gadolinium, calcium, strontium, or barium may be present up to about 2 atomic percent. The phosphor has a high stopping power, while the cerium provides luminescence with a high light output and a rapid decay of emitted light after luminescing.

DETAILED DESCRIPTION OF THE INVENTION

The phosphors of this invention may be used in a wide variety of applications as cathodoluminescent or photoluminescent emitters. For example, the phosphors can be distributed in the scintillator structures disclosed in U.S. Pat. Nos. 4,362,946 and 4,230,510, incorporated herein by reference. Such scintillator structures provide optical coupling of luminescence from the phosphor distributed in the scintillator to photoelectrically responsive devices.

The phosphor of this invention is a rare earth oxide compound comprised of cerium in an effective amount to provide luminescence. The oxide compound is of the perovskite-type having the general formula $ABO_3$ wherein A is lanthanum and B is lutetium. Although the formula shows a ratio of 1:1 for the A and B atoms in the compound, suitable compounds can be formed when A or B vary from the ideal ratio by up to about 2 atomic percent. Cerium replaces lanthanum in the compound and is present in at least an amount to provide a detectable light output from the compound, i.e., about 0.002 atomic percent. A detectable light output was also found when cerium completely replaces lanthanum in the compound. Therefore, the A component of the compound is comprised of about 0.002 to 22 atomic percent cerium, and up to about 22 atomic percent lanthanum. The B component is lutetium, however, it has been found that yttrium can replace the lutetium in part or completely without substantially degrading luminescence in the compound. Therefore, the B component of the compound is comprised of about 18 to 22 atomic percent of at least one of lutetium or yttrium. Cerium can be present in an amount of about 0.02 to 2 atom percent of the compound. Preferably, the B component is lutetium to provide a higher stopping power for radiation.

A preferred composition of the ABO₃ compound is comprised of about 0.02 to 2 atomic percent cerium, about 18 to 22 atomic percent lanthanum, about 18 to 22 atomic percent lutetium, and the balance substantially oxygen.

The phosphors can be formed by conventional methods well known in the art for forming oxide phosphor powders, for example disclosed in U.S. Pat. No. 4,424,671, incorporated herein by reference. Briefly described, oxides, or oxo-salts such as oxalates, carbonates, hydroxides, and nitrates that decompose to form oxides of lanthanum, cerium, lutetium, and yttrium in the ratio that forms the desired ABO₃ oxide compound, are mixed to a uniform distribution. The mixing can be carried out in an agate mortar and pestle or in a ball mill using water, heptane, or an alcohol such as ethyl alcohol as a liquid vehicle. Suitable milling media that are non-contaminating to the phosphor, i.e. reduce the light emitting properties, are zirconia or TEFLON synthetic resin polymers. Dry milling may also be used for both mixing and breakup of powder aggregates. If dry milling is employed, a grinding aid such as 1 to 5 weight percent of stearic acid or oleic acid should be employed to prevent powder packing or sticking inside the ball mill.

If the mixture is formed from the oxo-salts such as the nitrates, carbonates, hydroxides, or oxalates, a calcining step is required to obtain the corresponding oxides. The oxo-salts can be calcined in an oxidizing atmosphere such as air at about 700° to 1000° C. The oxide mixture is heat treated in an inert atmosphere at about 1200° to 1300° C., for about 1 to 4 hours to form the ABO₃ oxide compound. Suitable inert atmospheres are nitrogen, helium, hydrogen, air, or a vacuum. The heat treatments to calcine and form the oxide compound can be performed in a single heating step by heating to about 1200° to 1300° C. in the inert atmosphere.

The oxide compound is heated in a reducing atmosphere at about 1500° to 2000° C., and held for about 1 hour to provide the cerium luminescence. A suitable reducing atmosphere reduces the oxidation state of the cerium. For example, suitable reducing atmospheres are comprised of 10 percent hydrogen and the balance nitrogen, or dry nitrogen. A suitable reducing atmosphere has an oxygen partial pressure of about $10^{-5}$ atmospheres or less.

EXAMPLES

Rare earth solutions were formed by dissolving in an aqueous nitric acid solution lanthanum oxide, lutetium oxide, and cerium carbonate in ratios suitable for forming the oxide compounds shown in Table I below. Oxalic acid was mixed with the rare earth solutions to precipitate the oxalates. The oxalates were heated to 1250° C. in air for about 4 hours to calcine the oxalates, and form the oxide compounds. The oxide compounds were heat treated at 1600° C. for about 1 hour in an atmosphere comprised of about 90 percent nitrogen and 10 percent hydrogen to provide the cerium luminescence.

The powders were inspected by X-ray diffraction and found to have a substantially perovskite crystal form distorted to the orthorhombic crystal form. The light emission frequency of the powders was measured by UV spectrophotometer, and the gamma ray stopping power was determined by calculation from the attenuation coefficient of each element in the composition. The decay time constant of light emitted from the phosphor powders after excitation by radiation was measured by the delayed coincidence method as disclosed for example in "Measurement of the Time Dependence of Scintillator Intensity by a Delayed Coincidence Method," L. M. Bollinger and C. E. Thomas, Review Scientific Instruments, vol. 32, 1961, pp. 1044–1050, incorporated herein by reference. The light emission, decay time constant, and gamma ray stopping power are shown below in Table I. The gamma ray stopping power and decay time constant of a conventional bismuth germanate powder is shown for comparison.

TABLE I

| Composition | Peak of Light Emission (nanometers) | Range of Light Emission (nanometers) | Gamma Ray Stopping Power (cm⁻¹) | Decay Time Constant (nanoseconds) |
|---|---|---|---|---|
| $La_{0.999}Ce_{0.001}LuO_3$ | 440 | 350–500 | 0.92 | |
| $La_{0.99}Ce_{0.01}LuO_3$ | 440 | 350–500 | 0.92 | 20–30 |
| $La_{0.9}Ce_{0.1}LuO_3$ | 440 | 350–500 | 0.92 | |
| $CeLuO_3$ | 470 | 400–550 | 0.92 | |
| Bismuth Germanate | | | 0.955 | 300 |

A visual comparison of the light output of the rare earth oxide powders of this invention was made with bismuth germanate, and the light output of the oxide powders was observed to be comparable to or better than the bismuth germanate.

Referring to Table I, the rare earth oxide compound phosphor of this invention having cerium luminescence provides a comparable gamma radiation stopping power to bismuth germanate, with a decay time constant of emitted light that is about an order of magnitude less. In summary, it has been observed that the rare earth oxide compound phosphor provides comparable light output and gamma ray stopping power as compared to bismuth germanate, while providing a decay time constant of the emitted light that is about ten times faster than bismuth germanate.

What is claimed is:

1. A phosphor consisting essentially of, an oxide compound having the formula ABO₃ wherein A is cerium and lanthanum, and B is at least one of lutetium or yttrium, wherein A or B can vary by up to 2 atom percent from the 1:1 ratio of the formula, and cerium is present in an amount of about 0.02 to 2 atom percent.

2. A phosphor according to claim 1 wherein cerium is present in an amount of about 0.2 to 2 atom percent, and B is lutetium.

* * * * *